United States Patent
Kazan et al.

(10) Patent No.: US 9,077,733 B2
(45) Date of Patent: Jul. 7, 2015

(54) ROAMING APPLICATION SETTINGS ACROSS MULTIPLE COMPUTING DEVICES

(71) Applicant: Microsoft Corporation, Redmond, WA (US)

(72) Inventors: Wissam S. Kazan, Redmond, WA (US); John E. Brezak, Woodinville, WA (US); Matthew S. Baker, Redmond, WA (US); Todd R. Manion, Seattle, WA (US); Rob M. Mensching, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/097,146

(22) Filed: Dec. 4, 2013

(65) Prior Publication Data

US 2014/0095710 A1 Apr. 3, 2014

Related U.S. Application Data

(63) Continuation of application No. 12/725,059, filed on Mar. 16, 2010, now Pat. No. 8,606,889.

(60) Provisional application No. 61/297,205, filed on Jan. 21, 2010.

(51) Int. Cl.
*H04L 29/08* (2006.01)
*G06F 17/30* (2006.01)
(Continued)

(52) U.S. Cl.
CPC ...... *H04L 67/1095* (2013.01); *G06F 17/30067* (2013.01); *G06F 9/4451* (2013.01); *H04L 43/04* (2013.01)

(58) Field of Classification Search
None
See application file for complete search history.

(56) References Cited

U.S. PATENT DOCUMENTS 6,272,545 B1 * 8/2001 Flanagin et al. ............ 709/228
6,560,655 B1 5/2003 Grambihler et al.
(Continued)

FOREIGN PATENT DOCUMENTS

| CN | 1811704 | 8/2006 |
|---|---|---|
| CN | 102713886 | 10/2012 |
| WO | WO-2011090818 | 7/2011 |

OTHER PUBLICATIONS

Larkin "Applying Concurrent Versioning to Serverless Mobile Device Synchronisation", http://ieeexplore.ieee.org/iel5/4276338/4276339/04276374.pdf?tp=&isnumber=&arnumber=4276374, 2007, 6 pages.

(Continued)

*Primary Examiner* — Ario Etienne
*Assistant Examiner* — Clayton R Williams
(74) *Attorney, Agent, or Firm* — Aneesh Mehta; Kate Drakos; Micky Minhas (57) ABSTRACT

Application settings are roamed across multiple computing devices. Provider modules on the computing devices are run to retrieve application settings to be roamed and to roam those application settings across the multiple computing devices. Application setting changes initiated on a particular computing device are added to a history of application setting changes on the particular computing device, and also added to synchronization communication module for communication to one or more additional computing devices of the multiple computing devices. Application setting changes initiated by one of the one or more additional computing devices are received by the particular computing device and added to a history of application setting changes on the particular computing device, and are also incorporated into the application settings on the particular computing device.

20 Claims, 6 Drawing Sheets (51) Int. Cl.
*G06F 9/445* (2006.01)
*H04L 12/26* (2006.01)

(56) References Cited

U.S. PATENT DOCUMENTS

| | | | |
|---|---|---|---|
| 8,145,200 B2 | 3/2012 | May et al. | |
| 8,245,242 B2* | 8/2012 | Peterson et al. | 719/319 |
| 8,464,242 B2* | 6/2013 | Lanner et al. | 717/170 |
| 8,606,889 B2 | 12/2013 | Kazan et al. | |
| 8,909,712 B2* | 12/2014 | Singh et al. | 709/206 |
| 2004/0109436 A1 | 6/2004 | Vargas et al. | |
| 2005/0076087 A1 | 4/2005 | Budd et al. | |
| 2005/0091346 A1 | 4/2005 | Krishnaswami et al. | |
| 2006/0242206 A1* | 10/2006 | Brezak et al. | 707/201 |
| 2007/0014314 A1* | 1/2007 | O'Neil | 370/503 |
| 2007/0016630 A1 | 1/2007 | Samji et al. | |
| 2007/0283011 A1* | 12/2007 | Rakowski et al. | 709/225 |
| 2007/0283049 A1 | 12/2007 | Rakowski et al. | |
| 2008/0028102 A1 | 1/2008 | Peacock | |
| 2008/0215758 A1* | 9/2008 | Gerdes et al. | 709/248 |
| 2008/0244028 A1 | 10/2008 | Le et al. | |
| 2008/0307414 A1* | 12/2008 | Alpern et al. | 718/1 |
| 2009/0259698 A1* | 10/2009 | Sugiura | 707/201 |
| 2011/0179149 A1 | 7/2011 | Kazan et al. | |

OTHER PUBLICATIONS

"Application Settings Overview", Retrieved from: <http://msdn.microsoft.com/en-us/library/k4s6c3a0(VS.85).aspx> on Jan. 21, 2010, Microsoft Developer Network Library,2010, 4 pages.

"ClickOnce and Application Settings", Retrieved from: <http://msdn.microsoft.com/en-us/library/ms228995.aspx> on Jan. 21, 2010, .NET Framework Developer's Guide,2010, 2 pages.

"Final Office Action", U.S. Appl. No. 12/725,059, Sep. 14, 2012, 27 pages.

"Foreign Office Action", CN Application No. 201180006775.4, Apr. 30, 2014, 21 pages.

"International Search Report and Written Opinion", Application No. PCT/US2011/020200, Aug. 30, 2011, 10 pages.

"Non-Final Office Action", U.S. Appl. No. 12/725,059, Feb. 4, 2013, 31 pages.

"Non-Final Office Action", U.S. Appl. No. 12/725,059, Mar. 29, 2012, 23 pages.

"Non-Final Office Action", U.S. Appl. No. 12/725,059, Sep. 29, 2011, 21 pages.

"Notes 8.5 Roaming User Quickstart Guide", Retrieved from: <http://www-10.lotus.com/ldd/dominowiki.nsf/dx/notes-8.5-roaming-user-quickstart-guide> on Jan. 21, 2010, IBM Lotus Notes,Dec. 8, 2009, 3 pages.

"Notice of Allowance", U.S. Appl. No. 12/725,059, Aug. 2, 2013, 16 pages.

"Roaming Profiles—SeaMonkey", Retrieved from: <http://kb.mozillazine.org/Roaming_profiles_-_SeaMonkey> on Jan. 21, 2010, Feb. 6, 2009, 3 pages.

"UDA ADO.Net Data Provider Technical Architecture White Paper", Retrieved from: <http://uda.openlinksw.com/doc/Whitepaper/udadnet> on Jan. 21, 2010, 2010, 11 pages.

Edwards, et al.,' "Enterprise Rollout and Management of Firefox", Retrieved from: <http://www.windowsitpro.com/article/group-policy/enterprise-rollout-and-management-of-firefox> on Sep. 14, 2012,May 30, 2007, 3 pages.

Feller, "Ask the Architect TechTalk Successfully Migrating Users to Virtual Desktops", Citrix, Available at <http://www.citrix.com/site/resources/dynamic/additional/TechTalk_PartIII_Migrating_Users.pdf>,Aug. 2009, 42 pages.

Larkin, "Applying Concurrent Versioning to Serverless Mobile Device Synchronisation", http://ieeexplore.ieee.org/iel5/4276338/4276339/04276374.pdf?tp=&isnumber=&arnumber=4276374, 2007, 6 pages.

Tyson "Configuring Credential Roaming—Part 2", Retrieved from: <http://www.taosage.net/Blogs/tabid/36/EntryID/18/Default.aspx> on Jan. 21, 2010, Oct. 4, 2006, 7 pages.

Xinhui, et al.,' "Heterogeneous Data Source Synchronization with SyncML", Application Research of Computers vol. 23, Issue 6, Dec. 31, 2006, pp. 190-192, 195.

"Foreign Office Action", CN Application No. 201180006775.4, Jan. 6, 2015, 10 pages.

* cited by examiner

ROAMING APPLICATION SETTINGS ACROSS MULTIPLE COMPUTING DEVICES

RELATED APPLICATION

This application is a continuation of and claims priority to U.S. patent application Ser. No. 12/725,059 filed Mar. 16, 2010, which claims priority under 35 U.S.C. §119(e) to U.S. Provisional Patent Application No. 61/297,205 filed Jan. 21, 2010. The disclosures of these applications are incorporated by reference herein in their entirety.

BACKGROUND

Currently, many users use multiple computing devices, such as their home computer, work computer, laptop computer, and so forth. Oftentimes, users install the same applications on these devices, customizing these applications on each of the devices to their particular preferences. However, this can lead to user frustration because users are typically required to perform the same application customization on each of the multiple devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a history of application setting changes on a first computing device is monitored. In response to identification of a first change to application settings on the first computing device, the first change is added to a synchronization communication module for communication to one or more additional computing devices. In response to identification of a second change to application settings on a second device of the one or more additional computing devices, the second change is added to the history of application setting changes and is also incorporated into the application settings on the first computing device.

In accordance with one or more aspects, in a first computing device a provider module associated with an application is identified. One or more application settings of the application are stored in one or more settings locations known to the provider module. The provider module is run to retrieve one or more application settings, and to roam the one or more application settings across multiple computing devices. These multiple computing devices include both the first computing device and one or more additional computing devices.

BRIEF DESCRIPTION OF THE DRAWINGS

The same numbers are used throughout the drawings to reference like features.

DETAILED DESCRIPTION

Roaming application settings across multiple computing devices is discussed herein. In one or more embodiments, one or more application settings for an application are roamed across multiple computing devices. When a change is made to an application setting on one of the devices, the change is roamed to the other ones of the multiple devices. Accordingly, for that particular application, the application settings being roamed on the multiple devices will be the same, and any change to such an application setting made by a user on one device is automatically identified and communicated to the other devices as well. Application settings for multiple different applications on the devices can be roamed.

Figure 1:
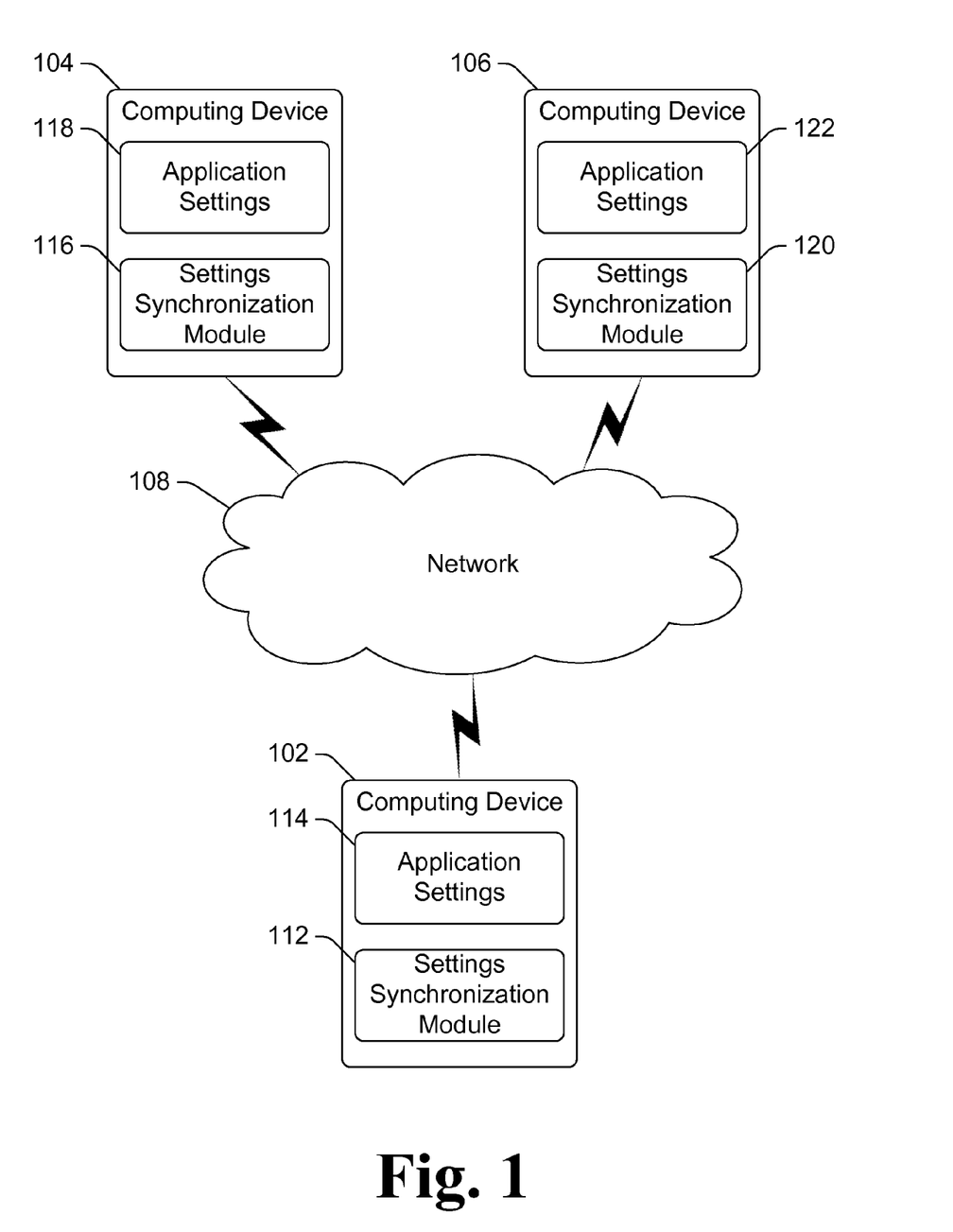
FIG. 1 illustrates an example system implementing the roaming application settings across multiple computing devices in accordance with one or more embodiments.

FIG. 1 illustrates an example system 100 implementing the roaming application settings across multiple computing devices in accordance with one or more embodiments. System 100 includes multiple computing devices 102, 104, and 106 that can communicate with one another via a network 108. Computing devices 102, 104, and 106 can each be a variety of different types of computing devices. For example, each computing device 102, 104, and 106 can be a desktop computer, a laptop or handheld computer, a mobile station, an entertainment appliance, a set-top box communicatively coupled to a display device, a television, a cellular or other wireless phone, a game console, an automotive computer, and so forth. Thus, each computing device 102, 104, and 106 may range from a full resource device with substantial memory and processor resources (e.g., personal computers, game consoles) to a low-resource device with limited memory and/or processing resources (e.g., traditional set-top boxes, handheld game consoles). Different computing devices 102, 104, and 106 can be the same or different types of computing devices.

Network 108 can be a variety of different networks, including the Internet, a local area network (LAN), a cellular or other telephone network, an intranet, other public and/or proprietary networks, combinations thereof, and so forth. Alternatively, computing devices 102, 104, and 106 can communicate directly with one another (e.g., using infrared communications, a wired connection, a wireless (e.g., wireless universal serial bus) connection, and so forth). Computing devices can also communicate with one another via one or more intermediary devices, such as one or more services or server computing devices.

Application settings for one or more applications can be roamed (also referred to as synchronized) across computing devices 102, 104, and 106. Whenever a change to a roamed application setting is made on one of computing devices 102, 104, and 106, it is automatically communicated to and saved by the other computing devices 102, 104, and 106. Although three computing devices 102, 104, and 106 are shown in system 100, it is to be appreciated that application settings can be roamed across two computing device, or alternatively across four or more computing devices. The particular computing devices across which application settings are to be roamed, as well as the particular applications settings that are to be roamed, can be identified in different manners as discussed in more detail below.

Each computing device 102, 104, and 106 includes a settings synchronization module and application settings. Computing device 102 includes settings synchronization module 112 and application settings 114, computing device 104 includes settings synchronization module 116 and application settings 118, and computing device 106 includes settings synchronization module 120 and application settings 122. Settings synchronization modules 112, 116, and 120 communicate with one another via network 108. Settings synchronization modules 112, 116, and 120 communicate changes to the application settings 114, 118, and 122 to one another, so that the roamed application settings on the computing devices 102, 104, and 106 are the same.

Figure 2:
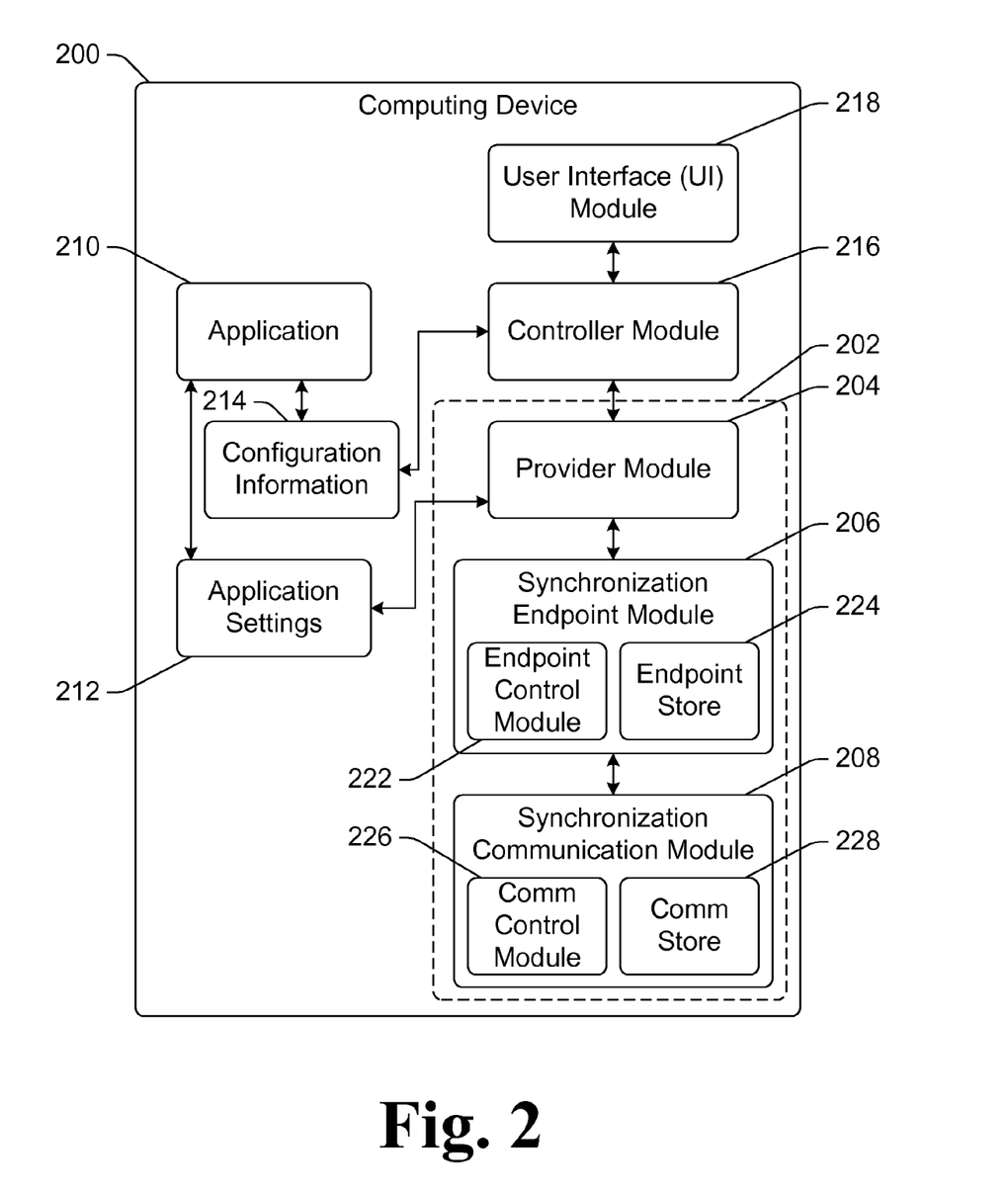
FIG. 2 illustrates an example computing device implementing the roaming application settings across multiple computing devices in accordance with one or more embodiments.

FIG. 2 illustrates an example computing device 200 implementing the roaming application settings across multiple computing devices in accordance with one or more embodiments. Computing device 200 can be, for example, a computing device 102, 104, or 106 of FIG. 1. Computing device 200 includes a settings synchronization module 202 that includes a provider module 204, a synchronization endpoint module 206, and a synchronization communication module 208. Computing device 200 also includes an application 210, one or more application settings 212, configuration information 214, and a controller module 216. Computing device 200 also optionally includes a user interface (UI) module 218. Settings synchronization module 202 can be, for example, a settings synchronization module 112, 116, or 120 of FIG. 1, and application settings 212 can be, for example, application settings 114, 118, or 122 of FIG. 1.

It should be noted that in computing device 200 various components or modules are illustrated. Although illustrated as individual components or modules, the functionality or data of multiple ones of these components or modules can alternatively be combined into a single component or module. Similarly, the functionality or data of one or more of these components or modules can alternatively be separated into multiple components or modules.

Computing device 200 includes an application 210 installed thereon. Although a single application 210 is illustrated in FIG. 2, it is to be appreciated that multiple applications can be installed on computing device 200. Application 210 has one or more application settings 212. Application settings 212 that are roamed are stored in one or more particular settings locations known to provider module 204 as discussed in more detail below. Application settings 212 can be stored in a variety of different types of settings locations. For example, a settings location can be a file, a folder or directory, a registration store (e.g., an operating system registry), and so forth. Application 210 reads its application settings from these one or more settings locations, and can also add new application settings to and/or change application settings in these one or more settings locations.

A variety of different types of data or values can be stored as application settings 212. Application settings 212 are configuration information or data that is used by application 210 when running. The particular types of settings that are stored can vary based on the application, and can include, for example, lists of favorite items (e.g., web sites), display formatting options, default fonts, dictionaries for spell-checking, drafts of user-entered data (e.g., a blog entry, an email message, etc.), and so forth.

Computing device 200 includes configuration information 214 stored in one or more configuration locations. Configuration information 214 includes information provided by application 210 to register itself for roaming application settings, and also to store user interface (UI) elements such as a name, an icon, and a description that are obtained to display in a UI as discussed in more detail below. Configuration information 214 includes, for example, a name of application 210, an icon to be displayed as representative of application 210, a description of application 210, information identifying a particular provider that application 210 desires to use, and so forth.

When application 210 is installed on computing device 200, the appropriate configuration information for application 210 is stored as configuration information 214. This configuration information for application 210 can be stored by application 210 itself or alternatively by another component or module (e.g., an installer application). Alternatively, application 210 can identify a resource (such as a localized resource DLL (dynamic link library)). This resource can be accessed by another component or module (e.g., an installer application) to obtain the configuration information for application 210.

In one or more embodiments, configuration information 214 includes an identifier of a provider module 204. As discussed in more detail below, the provider module 204 (also referred to as simply a provider) monitors application settings 212 for changes, and also stores as application settings 212 changes to application settings that are received from other computing devices. The identified provider module 204 is the provider module 204 that application 210 desires to use.

Alternatively, configuration information 214 need not include an identifier of a provider module 204. For example, in one or more embodiments a single provider module 204 is included in computing device 200. In such embodiments, no identifier of provider module 204 need be included in configuration information 214 as there is only one provider module 204. By way of another example, in one or more embodiments a default provider module 204 can be included in computing device 200. In such embodiments, if no identifier of a provider module 204 is included in configuration information 214, then the default provider module 204 is used as the provider module 204 for application 210.

Computing device 200 can include one or more provider modules 204. Application 210 has an associated provider module 204 (e.g., the provider module 204 identified in configuration information 214, a default provider module 204, etc.). The provider module 204 associated with application 210 is aware of the various settings locations where application settings 212 for application 210 are stored. A provider module 204 can be an application-specific provider module. An application-specific provider module is configured with or otherwise has knowledge of the various settings locations where application settings 212 for application 210 are stored. Different applications can store application settings in different settings locations and/or in different manners, and the application-specific provider module associated with each such different application is configured with or otherwise has knowledge of the settings locations and/or manners in which the application settings are stored for the associated application.

A generic provider module can also be included on each device and can be used for multiple different applications. The generic provider module accesses one or more particular settings locations (e.g., one or more keys of an operating system registration store, one or more directories or folders, etc.) for application settings 212. Accordingly, if application 210 stores application settings 212 in those one or more particular settings locations, the generic provider module roams those application settings 212.

Controller module 216 manages loading and running of provider module 204. During operation, controller module 216 identifies the provider module 204 desired by application 210 based on configuration information 214. If the provider module 204 desired by application 210 is not already running, controller module 216 loads and runs the provider module 204 desired by application 210.

Controller module 216 can load and run the provider module 204 desired by application 210 in response to a variety of different events. In one or more embodiments, controller module 216 loads and runs provider module 204 when computing device 200 is logged into a service or is otherwise in communication with another computing device allowing roaming of application settings. For example, controller module 216 can load and run provider module 204 when computing device 200 logs into a separate service via a network (e.g., a synchronization service logged into via network 108 of FIG. 1), when a synchronization connection is established with another computing device (e.g., synchronization communication module 208 is communicating with a synchronization communication module of another computing device), and so forth.

In other embodiments, controller module 216 loads and runs provider module 204 in response to other events. For example, provider module 204 can be loaded and run in response to application 210 being loaded and run. By way of another example, provider module 204 alternatively can be loaded and run whenever computing device 200 is powered on and running (regardless of whether application 210 is running at the time), whenever computing device 200 is in communication with a network (e.g., network 108 of FIG. 1), and so forth.

In one or more embodiments, particular applications and/or particular application settings can be selected for roaming across multiple computing devices. This selection can be performed by a variety of different entities, such as by a user of computing device 200, by an administrator of computing device 200 or service that computing device 200 accesses (e.g., a synchronization service), by another component or module of computing device 200 or another device, and so forth.

In one or more embodiments, a user of computing device 200 can select particular applications and/or particular application settings via user interface module 218. User interface module 218 displays or otherwise presents to the user of computing device 200 a representation of one or more applications that can be run on computing device 200. These one or more applications are identified, for example, from the information included in configuration information 214. User interface module 218 allows the user of computing device 200 to select particular ones of the applications that can be run on computing device 200. These selected applications are the applications for which application settings are roamed. An indication of which applications have their application settings roamed is maintained in configuration information 214.

Similarly, user interface module 218 can display or otherwise present to the user of computing device 200 a representation of different types of application settings that are to be roamed. For example, a particular application may have multiple types of settings stored in application settings 212, such as a list of favorite items, display formatting options, and a dictionary for spell-checking. A user can select, via user interface module 218, to roam all of these application settings or only particular types of these application settings. For example, the user could select to roam the list of favorite items and the dictionary for spell-checking, but not roam the display formatting options. An indication of which application settings are roamed is maintained in configuration information 214.

The particular applications and/or application settings selected for roaming are identified to controller module 216. For each application for which at least one type of application setting is roamed, controller module 216 loads and runs the provider module 204 associated with the application. This provider module 204 associated with the application is identified in configuration information 214 as discussed above. The provider module 204 then works with synchronization endpoint module 206 and synchronization communication module 208 to roam the selected types of application settings for the associated selected application, as discussed in more detail below.

Table I below illustrates example configuration information 214. It is to be appreciated that the information included in Table I is an example of configuration information 214, and that alternatively additional information can be included in configuration information 214 and/or some information listed in Table I can be excluded from configuration information 214.

TABLE I

| Name/Subkey | Data/Description |
| --- | --- |
| Provider | Provider CLSID. This is the class ID identifying the provider that the application desires to use. |
| Display Name | Points to the display name in a resource file provided by the application. This is used by the UI module to display the application name in the UI. This can be a string. |
| Description | Points to the description in the resource file provided by the application. This is used by the UI module to display the application description in the UI. |
| Icon | Points to the icon in the resource file provided by the application. This is used by the UI module to display the application icon in the UI. |
| LiveFolder | If this key is present and valid, this means that the application has some settings in files in a folder for an online service (e.g., a folder located at the following path: %APPDATA%\Microsoft\WindowsLive\Roaming\AppNAME). This online service can be, for example, a synchronization service that assists with roaming of the application settings. This is used by the controller module to identify additional locations where application settings are stored. |
| Suite | Name of the Subkey under \suites that corresponds to the suite the application is part of. This can be used by the UI module to display an indication of the suite that the application is part of, and/or by the controller module to identify additional locations where application settings are stored. |

In one or more embodiments, the user of computing device 200 can identify one or more other computing devices with which application settings are roamed. User interface module 218 can allow a user to select one or more other computing devices with which application settings are roamed, or alternatively this identification can be performed in other manners. These other computing devices with which application settings are roamed include, for example, other computing devices that are owned and/or used by the user of computing device 200. A record of the computing devices across which application settings are roamed can be maintained at computing device 200 (e.g., by provider module 204 or synchronization communication module 208), or alternatively can be maintained at a remote service (such as a synchronization service).

In one or more embodiments, controller module 216 communicates with a remote service, such as a synchronization service, to identify possible other computing devices with which application settings can be roamed. This service is accessed, for example, via network 108 of FIG. 1. These possible other computing devices can be identified in different manners, such as by including computing devices that the user selects to register with the service for roaming, computing devices from which the user logs into the service, computing devices from which the user logs into the service using the same user credentials (such as id and password), and so forth. The service maintains a record of these possible other computing devices, and this record can be accessed by controller module 216. User interface module 218 obtains this record from controller module 216, and uses the record to display or otherwise present to the user of computing device 200 a list of other computing devices from which the user can select one or more computing devices with which application settings are roamed.

Alternatively, the one or more other computing devices with which application settings are roamed can be identified in different manners. For example, application settings can be roamed across all computing devices from which a user logs into a remote service (such as a synchronization service). By way of another example, a user can specify via a user interface presented by the remote service when the user is logged into the remote service with a particular computing device, whether application settings are to be roamed with that particular computing device.

When provider module 204 is loaded, provider module 204 obtains the roamed application settings 212. These roamed application settings 212 are the application settings 212 that have been selected for roaming. Provider module 204 thus has knowledge of the current application settings 212 for application 210 (also referred to as the application settings state for application 210).

In addition to provider module 204, synchronization module 202 includes a synchronization endpoint module 206 (also referred to as a feedsync endpoint with storage (FEWS)) and a synchronization communication module 208 (also referred to as a mesh operating environment (MOE)). Synchronization communication module 208 refers in part to the underlying synchronization platform being used to communicate application settings among the various computing devices across which the application settings are being roamed. Synchronization communication module 208 communicates with the synchronization communication modules on other computing devices across which application settings are roamed. Generally, changes to application settings on one computing device that are being roamed are identified, communicated to the other computing device, and updated in the application settings location of that other device. The application on this other device obtains and uses these application settings. Thus, for application settings being roamed, changes to application settings on one device are communicated to one or more other devices so that the applications running on the devices have the same application settings.

Synchronization endpoint module 206 includes an endpoint control module 222 and endpoint store 224 that maintains a history of changes to roamed application settings 212 on computing device 200. For each change to a roamed application setting, an indication of the change that was made (e.g., the particular value or values that were added, deleted, or updated), as well as an identifier of the computing device that initiated the change and a timestamp of when the change was made on the computing device that initiated the change, is recorded in endpoint store 224.

From the perspective of computing device 200, a change to an application setting can be an incoming change or an outgoing change. Whether a change is an incoming change or an outgoing change is dependent on whether the change was initiated at computing device 200 or another computing device. A change being initiated at a particular device refers to the computing device running the application 210 via which the change was made (regardless of whether the change was made in response to a user request to change the application setting, or was made automatically by the application 210 itself). An incoming change refers to a change in an application setting that is initiated at and received from another computing device. An outgoing change refers to a change in an application setting initiated on computing device 200. Incoming changes are received from the other computing device via synchronization communication module 208 and applied to application settings 212 by provider module 204. Outgoing changes are provided to synchronization communication module 208 and communicated by module 208 to the other devices (where they are treated as incoming changes).

Provider module 204 monitors application settings 212 and identifies when a change to a roamed application setting 212 is made. This identification can be performed in different manners, such as obtaining (at regular or irregular intervals) the current state of application settings 212 and determining whether any application settings have change since the last time the current state of application settings 212 was obtained. Alternatively, this identification can be performed in different manners, such as application 210 or another component or module notifying provider module 204 of when a change to a roamed application setting 212 has been made. Regardless of how identified, a timestamp identifying when the change to the application setting 212 was made on computing device 200 is also identified by provider module 204. This timestamp can be identified in different manners, such as being a timestamp on a file in which application settings 212 are stored, a timestamp recorded by application 210 when the change is made, and so forth.

When a change to a roamed application setting 212 is made, provider module 204 identifies the change and adds an indication of the change to endpoint store 224 of synchronization endpoint module 206. Endpoint store 224 maintains a record of this change, along with an identifier of computing device 200 (as the device at which the application setting change is initiated) and the timestamp.

It is to be appreciated that the changed application setting need not be stored in application settings 212 in the same manner as the indication of the change is stored in endpoint store 224. Accordingly, provider module 204 converts the format of the application setting used in application settings 212 to the format of the application setting used in endpoint store 224. For example, provider module 204 can obtain the application setting from a particular portion of a file or a particular operating system registration store, and include that application setting in endpoint store 224.

Synchronization communication module 208 includes a communication (comm) control module 226 and a communication store 228 that maintains a history of application setting changes that have been communicated to, or received from, one or more other computing devices. Similar to synchronization endpoint module 206, for each application setting change an indication of the change that was made (e.g., the particular value or values that were added, deleted, or updated), as well as a timestamp of when the change was made on the computing device making the change and an identifier of the computing device making the change is recorded in communication store 228.

Provider module 204 invokes a merge process of endpoint control module 222 to merge the application settings included in endpoint store 224 and communication store 228. Provider module 204 can invoke the merge process when a change to application settings 212 is identified and added to synchronization endpoint module 206, or alternatively at other times (e.g., at regular or irregular intervals). The merge process determines the differences between application setting changes recorded in endpoint store 224 and application setting changes recorded in communication store 228. An application setting change newly identified by provider module 204 and included in endpoint store 224 is not yet included in communication store 228. The merge process identifies that the application setting change newly added to endpoint store 224 does not exist in communication store 228, and adds the application setting change to communication store 228. It should be noted that since the merge process of endpoint control module 222 is adding the application setting change from endpoint store 224 to communication store 228, application settings 212 need not be updated because the change is already reflected in application settings 212.

Communication control module 226 of synchronization communication module 208 communicates the application setting change that was recently added to communication store 228 to one or more other computing devices with which the application settings are roamed. Communication control module 226 can communicate the application setting change to the one or more other computing devices in a variety of different manners, such as directly to the other devices, via a network (e.g., network 108 of FIG. 1), via a synchronization service (e.g., which stores the application setting change until the other computing devices access the synchronization service), and so forth. Accordingly, the outgoing change is communicated to the other computing devices with which the application settings are roamed.

Communication control module 226 also receives communications from one or more other computing devices with which the application settings are being roamed, these received communications identifying application setting changes made on those other computing devices. For such incoming changes, provider module 204 also invokes the merge process of control module 222. Provider module 204 can invoke the merge process at a variety of different times, such as in response to being notified by communication control module 226 that an incoming change has been received by communication control module 226, at regular or irregular intervals, and so forth.

As indicated above, the merge process determines the differences between application setting changes recorded in endpoint store 224 and application setting changes recorded in communication store 228. Accordingly, an incoming change received by communication control module 226 but not yet included in endpoint store 224 of synchronization endpoint module 206 is identified by the merge process. Such an incoming change identified by the merge process is added to both endpoint store 224 and application settings 212 by provider module 204. Thus, the change to the application settings made on the other device is also made on computing device 200. In one or more embodiments the change to application settings 212 includes a timestamp of when the application setting change was made on the computing device that initiated the change, although alternatively other timestamps can be used.

As discussed above, it is to be appreciated that the changed application setting need not be stored in application settings 212 in the same manner as the indication of the change is stored in endpoint store 224. Accordingly, provider module 204 converts the format of the application setting used in synchronization endpoint module 206 to the format of the application setting used in application settings 212.

The merge process as discussed above determines differences between application setting changes recorded in endpoint store 224 and application setting changes recorded in communication store 228. Such differences can be determined in different manners. In one or more embodiments, the differences are determined by comparing the application setting changes recorded in endpoint store 224 to the application setting changes recorded in communication store 228 and identifying the differences between the two. In other embodiments, the differences are identified by comparing a current state of one of the stores 224 or 228 to a previous state of that same store, and identifying any differences in the state as the differences between the two. For example, new application setting changes included in a current state of endpoint store 224 that were not in the previous state of endpoint store 224 are assumed to have not yet been added to communication store 228. By way of another example, new application setting changes included in a current state of communication store 228 that were not in the previous state of communication store 228 are assumed to have not yet been added to endpoint store 224.

As part of the merge process, conflicts regarding application setting changes can occur. Conflicts regarding application setting changes occur when two or more different changes are made to the same application setting at approximately the same time. For example, conflicts can arise when two computing devices change the same application setting to different values at approximately the same time, when one computing device changes an application setting at approximately the same time another computing device deletes the application setting, and so forth.

During the merge process, endpoint control module 222 can identify such conflicts. A conflict is identified by the endpoint control module 222 when an incoming change and an outgoing change are to the same application setting, as well as when multiple incoming changes are to the same application setting. Endpoint control module 222 automatically resolves conflicts by applying a particular policy to determine which change to the application setting that is to be applied (in other words, to determine which setting wins). Alternatively, information regarding the changes can be provided to another component or module (such as provider module 204), which in turn can resolve conflicts by applying a particular policy to determine which change to the application setting that is to be applied.

A variety of different policies can be used to determine which change to the application setting is to be applied. For example, one such policy is that the change having the most recent timestamp is the change to the application setting that is applied. By way of another example, another policy is that the user is prompted to select one of the changes to keep, and the user-selected change is the change to the application setting that is applied.

It should be noted that provider module 204 can also use synchronization endpoint module 206 to distinguish between an application setting change that is a deletion of an application setting initiated at computing device 200 and an application setting change that is an addition of an application setting initiated at another computing device. As the history of application setting changes is maintained in synchronization endpoint module 206, distinctions between such additions and deletions can be readily made by provider module 204.

In addition to sending and/or receiving changes to application settings, sets of multiple application settings can be sent and/or received. Synchronization communication module 208 can send a set of multiple application settings to another computing device to have the multiple application settings on the other computing device replaced with that set. Similarly, synchronization communication module 208 can receive a set of multiple application settings from another computing device, and provider module 204 can replace application settings 212 with the received set of multiple application settings.

The set of multiple application settings can be identified in different manners, such as communication control module 226 receiving a communication that is identified (e.g., by a particular flag value or command in the communication) as having a set of multiple application settings. Communication control module 226 maintains the received set of multiple application settings separate from communication store 228, and provider module 204 obtains the application settings 212 from communication control module 226. Thus, rather than invoking the merge process of endpoint control module 222, provider module 204 obtains the received set of multiple application settings from communication control module 226 and replaces application settings 212 with the set of multiple application settings. Similarly, provider module 204 can provide a set of application settings to communication control module 226 to be sent to the other computing devices across which application settings are roamed. Rather than invoking the merge process of endpoint control module 222, provider module 204 sends the set of application settings to communication control module 226.

For example, a user request to retrieve a set of multiple application settings (e.g., all the application settings being roamed for a particular application) can be received by provider module 204 (e.g., via UI module 218). Such a request can be received for different reasons, such as a user desire to replace settings he or she believes have become corrupt, to configure a new computing device with application settings from another computing device, and so forth. In response to the user request, provider module 204 sends (via communication control module 226) a request for the set of multiple application settings to the other computing devices across which the application settings are roamed. The set of multiple application settings is subsequently received from another computing device by communication control module 226 and provided to provider module 204. Provider module 204 then replaces the corresponding settings in application settings 212 with the received set of application settings.

Figure 3:
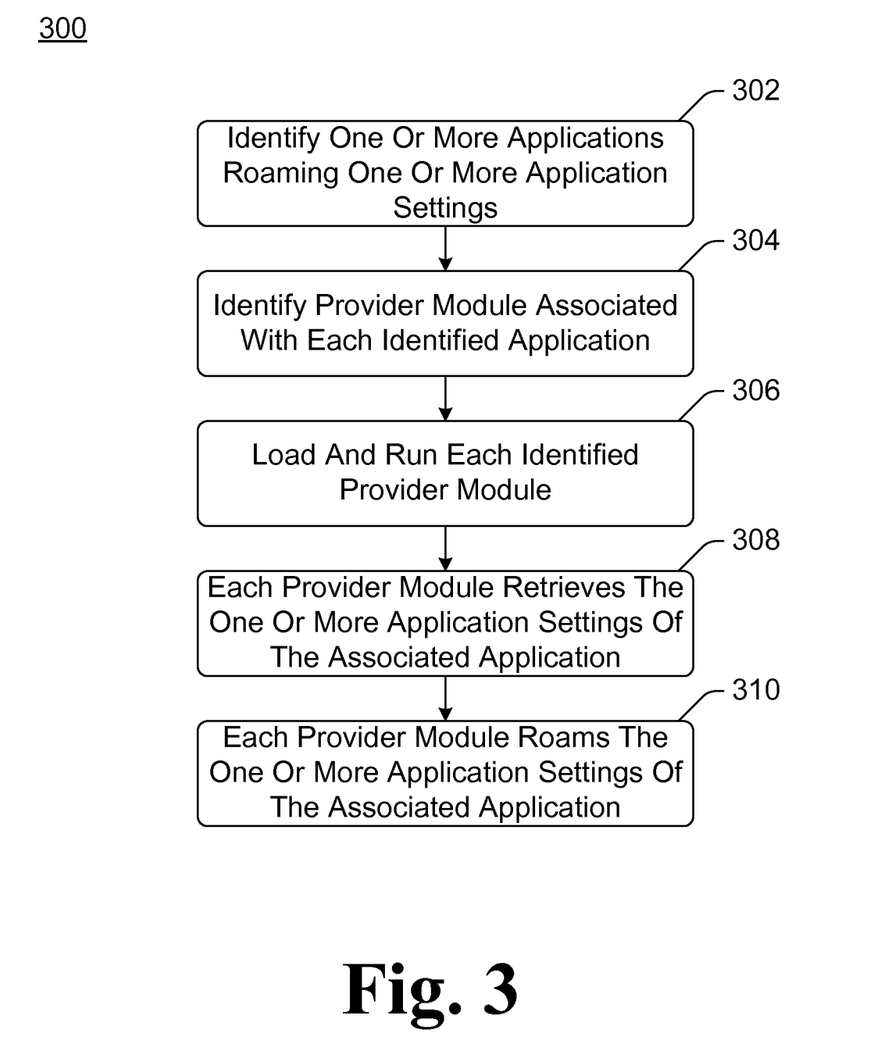
FIG. 3 is a flowchart illustrating an example process for configuring a computing device and roaming application settings in accordance with one or more embodiments.

FIG. 3 is a flowchart illustrating an example process 300 for configuring a computing device and roaming application settings in accordance with one or more embodiments. Process 300 is carried out by a computing device, such as computing device 200 of FIG. 2, and can be implemented in software, firmware, hardware, or combinations thereof. Process 300 is shown as a set of acts and is not limited to the order shown for performing the operations of the various acts. Process 300 is an example process for configuring a computing device and roaming application settings; additional discussions of configuring a computing device and roaming application settings are included herein with reference to different figures.

In process 300, one or more applications each roaming one or more application settings are identified (act 302). These one or more applications can be identified by a controller based on configuration information for applications installed on the computing device as discussed above.

A provider module associated with each application identified in act 302 is identified (act 304). This provider module can be an application-specific provider module or a generic provider module as discussed above.

Each provider module identified in act 304 is loaded and run (act 306). The provider modules can be loaded and run at different times or in response to different events as discussed above.

Each provider module run in act 306 retrieves the one or more application settings roamed for the application associated with the provider module (act 308), and roams these one or more application settings across the multiple computing devices (act 310). This roaming includes sending and/or receiving changes to application settings, as well as sending and/or receiving sets of multiple application settings, as discussed above.

Figure 4:
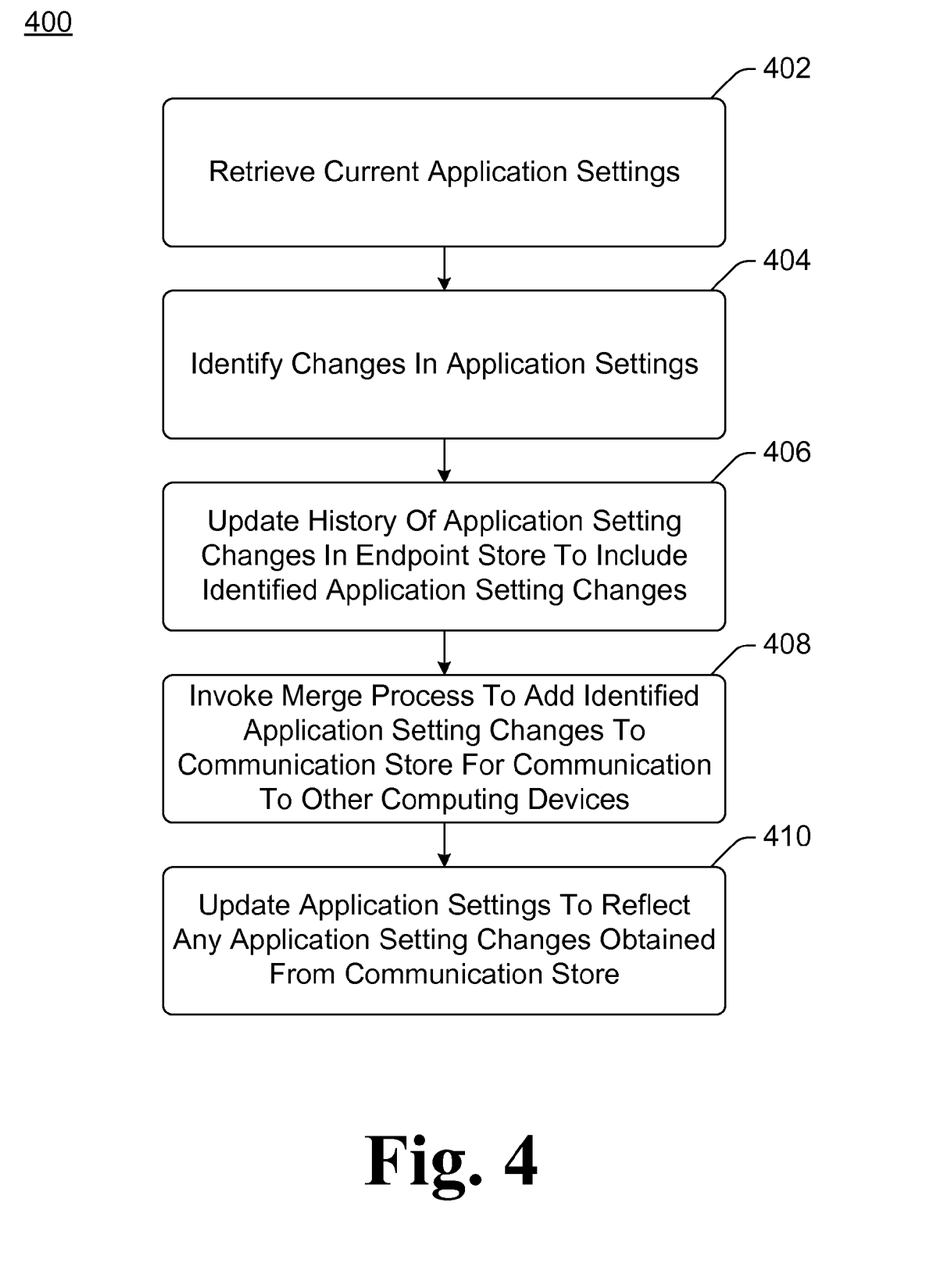
FIG. 4 is a flowchart illustrating an example process for a provider when roaming application settings in accordance with one or more embodiments.

FIG. 4 is a flowchart illustrating an example process 400 for a provider when roaming application settings in accordance with one or more embodiments. Process 400 is carried out by a computing device, such as computing device 200 of FIG. 2, and can be implemented in software, firmware, hardware, or combinations thereof. Process 400 is shown as a set of acts and is not limited to the order shown for performing the operations of the various acts. Process 400 is an example process for a provider when roaming application settings; additional discussions of a provider when roaming application settings are included herein with reference to different figures.

In process 400, current application settings are retrieved (act 402). These current application settings are the application settings that are being roamed, as discussed above.

Changes in the application settings are identified (act 404). The application setting changes can be identified in a variety of different manners, as discussed above.

In act 406, a history of application setting changes maintained in an endpoint store is updated to include the application setting changes that are identified in act 404. The endpoint store is included in a synchronization endpoint module as discussed above.

A merge process is also invoked to add the application setting changes identified in act 404 to a communication store for communication to the other computing devices across which application settings are roamed (act 408). The communication store is included in a synchronization communication module as discussed above.

Additionally, the application settings are updated to reflect any application setting changes obtained from the communication store (act 410). Such application setting changes are application setting changes received from other computing devices across which application settings are roamed, and are incorporated into the application settings of the computing device as discussed above.

Figure 5:
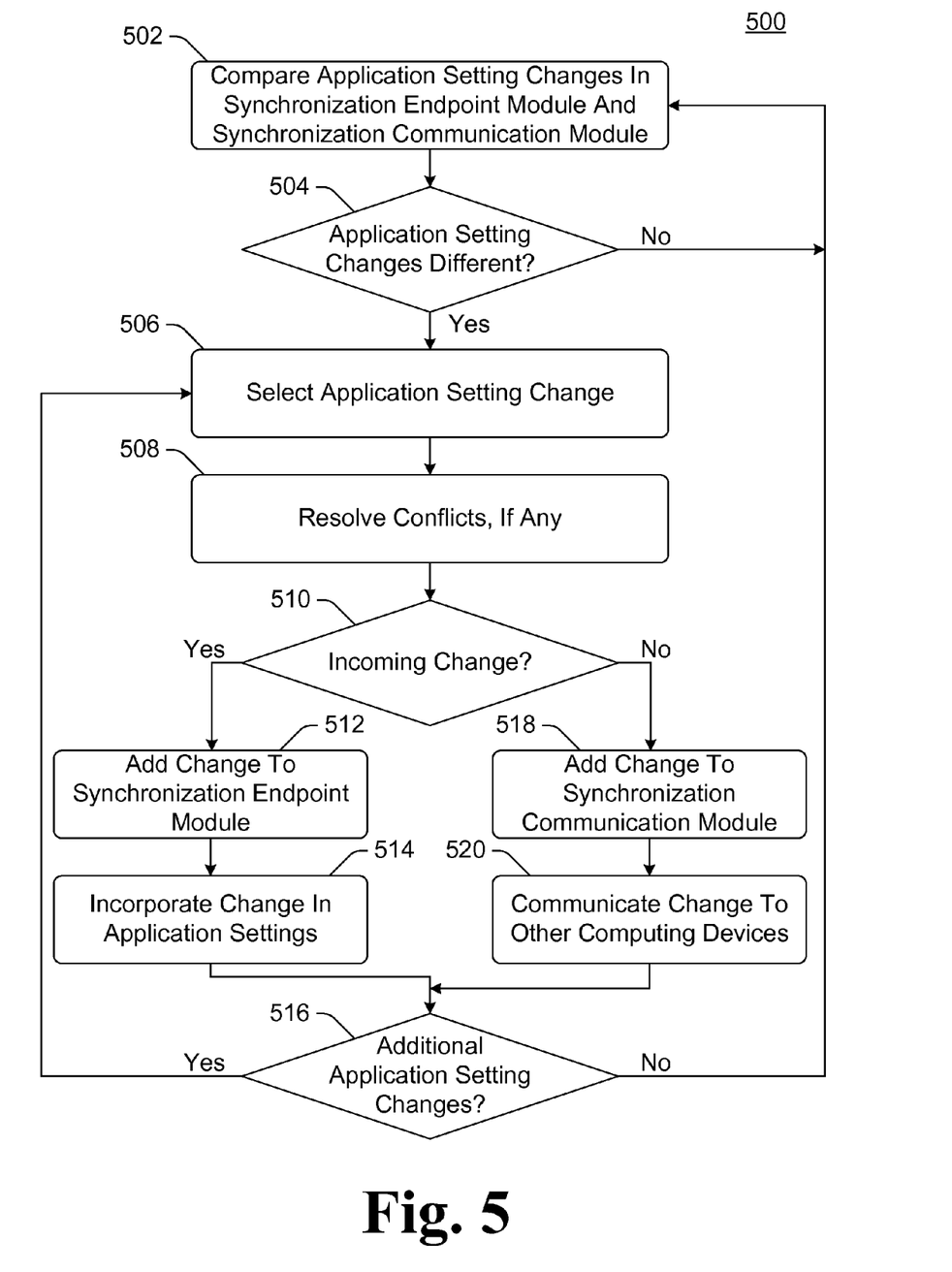
FIG. 5 is a flowchart illustrating an example process for roaming application settings across multiple computing devices in accordance with one or more embodiments.

FIG. 5 is a flowchart illustrating an example process 500 for roaming application settings across multiple computing devices in accordance with one or more embodiments. Process 500 is carried out by a computing device, such as computing device 200 of FIG. 2, and can be implemented in software, firmware, hardware, or combinations thereof. Process 500 is shown as a set of acts and is not limited to the order shown for performing the operations of the various acts. Process 500 is an example process for roaming application settings across multiple computing devices; additional discussions of roaming application settings across multiple computing devices are included herein with reference to different figures.

In process 500, application setting changes in the synchronization endpoint module and the synchronization communication module are compared (act 502) and a determination made as to whether any of the application settings changes in the two modules are different (act 504). The application settings changes in the two modules are different if one of the modules includes one or more application setting changes that is not included in the other module. This comparison can be performed in response to different events as discussed above. This comparison is also repeated at various intervals, as discussed above, until one or more application setting changes in the two modules are different.

If the application setting changes are different, then an application setting change is selected (act 506). This application setting change is an application setting change difference that is determined to exist in act 504 (e.g., an application setting change that is included in one of the two modules but not the other). If there are multiple application setting changes that are different, then one such application setting change is selected. The one application setting change can be selected in different manners, such as based on most recent or oldest timestamp, according to some other rules or criteria, randomly, and so forth.

Any conflicts involving the selected application setting change are resolved (act 508). Such conflicts can be resolved in different manners, as discussed above.

A check is made as to whether the selected application setting change is an incoming change (act 510). If the selected application setting change is an incoming change, then the selected application setting change is added to the synchronization endpoint module of the computing device (act 512) and incorporated into the application settings of the computing device (act 514).

A check is then made as to whether there are additional application setting changes that were determined to exist in act 504 but have not yet been selected in act 506 (act 516). If there are additional application setting changes that have not yet been selected in act 506 then process 500 returns to act 506 to select one of such application setting changes. However, if there are no such additional application setting changes then process 500 returns to act 502 to compare the application setting changes in the synchronization endpoint module and the synchronization communication module.

Returning to act 510, if the selected application setting change is not an incoming change, then the selected application setting change is an outgoing change. Accordingly, the selected application setting change is added to the synchronization communication module of the computing device (act 518) and communicated to the one or more other computing devices across which application settings are roamed (act 520). A check is then made as to whether there are additional application setting changes that were determined to exist in act 504 but have not yet been selected in act 506 (act 516), and process 500 returns to act 506 or act 502 based on the result of this check as discussed above.

The roaming application settings across multiple computing devices discussed herein supports a variety of different usage scenarios. One such usage scenario is that a user can easily keep the same application settings on multiple different ones of his or her computing devices. If the user desires to change a particular setting, the user can make that change on one of his or her devices and have that change automatically applied to all of his or her other computing devices.

Another usage scenario is that a user can obtain a new computing device and easily have the application settings on that new computing device changed to be the same as the application settings on his or her other computing devices. The user can simply indicate that the new computing device is one of the devices across which application settings are to be roamed, and the application settings from his or her other devices will automatically be applied on the new computing device.

Another usage scenario is that a user can effectively backup his or her application settings and subsequently have them applied to one or more computing devices as he or she desires. As the application settings are roamed across multiple devices, if the application settings are lost for some reason on a particular computing device, the settings can be readily obtained from another computing device.

Another usage scenario is that a user can start an activity on one computing device and easily finish the activity on a different computing device. For example, a user can start creating a blog entry or email message on a first device and that blog entry or email message can be a setting that is roamed across his or her computing devices. The user can then resume working on the blog entry or email message on a second device as the blog entry or email message has been roamed from the first device to the second device.

Figure 6:
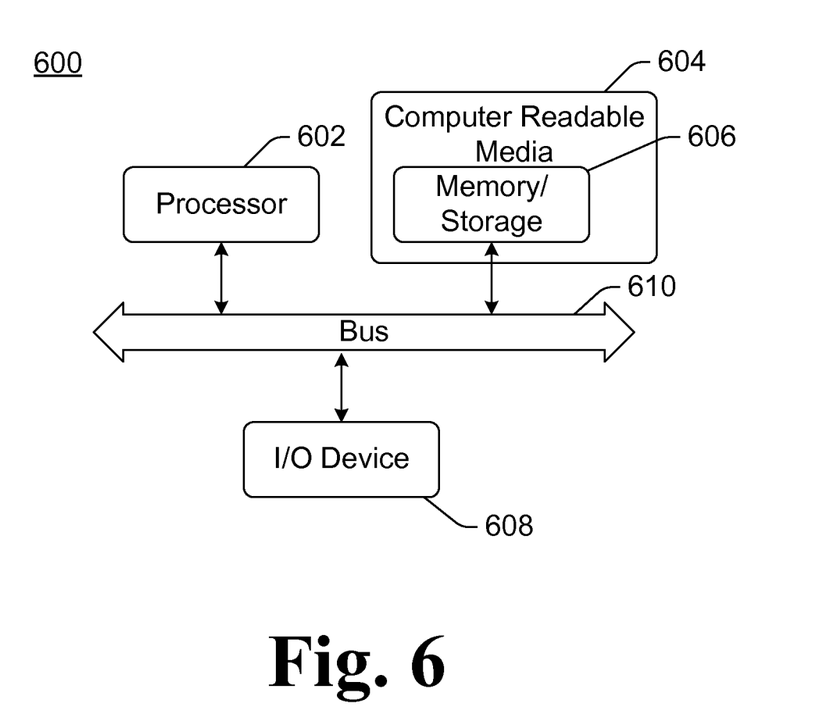
FIG. 6 illustrates an example computing device that can be configured to implement the roaming application settings across multiple computing devices in accordance with one or more embodiments.

FIG. 6 illustrates an example computing device that can be configured to implement the roaming application settings across multiple computing devices in accordance with one or more embodiments. Computing device 600 can be, for example, a computing device 200 of FIG. 2, or one of computing devices 102, 104, or 106 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the roaming application settings techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices of a service provider to implement a synchronization service, the method comprising:
    causing a provider module to monitor a history of application setting changes for a particular application and on a first computing device that is associated with a user of the synchronization service, the provider module being specified in configuration information associated with the particular application; and
    in response to identification by the provider module of a first change to application settings on the first computing device, converting application settings associated with the first change from a format used by the particular application, to a different format that enables synchronization via the synchronization service with at least one other computing device; and
    after said converting, adding the first change to a synchronization communication module and employing the synchronization communication module to communicate the first change to the at least one other computing device associated with the user for synchronization.

2. A method as recited in claim 1, wherein causing the provider module to monitor the history of application setting changes is performed when the first computing device is logged into the synchronization service.

3. A method as recited in claim 1, further comprising establishing a synchronization connection between the first computing device and the at least one other computing device.

4. A method as recited in claim 3, wherein the synchronization communication module is employed to communicate the first change to the at least one other computing device when the synchronization connection is established between the first computing device and the at least one other computing device.

5. A method as recited in claim 1, further comprising identifying computing devices that are associated with the user of the synchronization service and across which application settings are to be synchronized.

6. A method as recited in claim 5, wherein the computing devices are identified based on selections received from the user to register the computing devices with the synchronization service for synchronization of the application settings.

7. A method as recited in claim 1, further comprising maintaining a record of computing devices that are associated with the user of the synchronization service and across which the application settings are synchronized.

8. A method as recited in claim 1, further comprising causing a list of one or more computing devices associated with the user of the synchronization service to be presented to the user, the one or more computing devices being selectable from the list for synchronization of the application settings.

9. A method as recited in claim 1, wherein the one or more computing devices that implement the synchronization service are remote from the first computing device associated with the user of the synchronization service and the at least one other computing device associated with the user of the synchronization service.

10. One or more computer-readable storage memories comprising instructions stored thereon that are executable to implement a synchronization service to perform operations comprising:
    registering at least two computing devices to a user of the synchronization service to synchronize application settings across the at least two computing devices;
    causing a provider module to monitor a history of changes to the application settings for a particular application and on a first computing device registered to the user, the provider module being specified in configuration information associated with the particular application; and
    in response to identification by the provider module of a first change to application settings on the first computing device registered to the user, causing the provider module to:
        convert the application settings corresponding to the first change from a format that is used by the particular application to a different format that is used by the synchronization service to synchronize the application settings with other computing devices registered to the user; and add the first change formatted in the different format to a synchronization communication module and employing the synchronization communication module to communicate the first change to the other computing devices.

11. One or more computer-readable storage memories as recited in claim 10, wherein causing the provider module to monitor the history of changes to the application settings is performed when the first computing device registered to the user is logged into the synchronization service.

12. One or more computer-readable storage memories as recited in claim 10, wherein the operations further comprise establishing a synchronization connection between the first computing device registered to the user and the other computing devices registered to the user.

13. One or more computer-readable storage memories as recited in claim 10, wherein the operations further comprise maintaining a record of computing devices that are registered to the user of the synchronization service, and wherein the synchronization service synchronizes application settings across the computing devices identified by the record.

14. One or more computer-readable storage memories as recited in claim 10, wherein the registering is performed by causing a list of computing devices associated with the user of the synchronization service to be presented to the user, wherein the list includes the at least two computing devices, and wherein the computing devices presented as part of the list are selectable from the list for synchronization of the application settings.

15. One or more computer-readable storage memories as recited in claim 10, wherein the history of changes to the application settings includes, for each change to the application settings:
    an indication of one or more changed application settings;
    an indication of which of the at least two computing devices that are registered to the user initiated the change; and
    a timestamp of when the change was made to the one or more changed application settings.

16. A system comprising:
    one or more processors; and
    a memory comprising instructions stored thereon that, responsive to execution by the one or more processors, implement a synchronization service to perform operations comprising:
        receiving a request to register a computing device to a user of the synchronization service, the registering enabling changes to application settings on the computing device to be synchronized with at least one other computing device registered to the user; and
        in response to identification by a provider module of a change to the application settings on the computing device:
            converting the application settings corresponding to the change from an application-specific format of a particular application to a synchronization format that enables a synchronization communication module to communicate changed application settings for synchronization via the synchronization service; and
            adding the change to the synchronization communication module and employing the synchronization communication module to communicate the change to at least one other computing device registered to the user, wherein the provider module is used to monitor changes to the application settings for the particular application and is specified in configuration information associated with the particular application.

17. A system as recited in claim 16, wherein the operations further comprise causing the provider module to monitor a history of the changes to the application settings on the computing device once registered to the user.

18. A system as recited in claim 16, wherein the operations further comprise maintaining a record of the computing devices that are registered to the user of the synchronization service, and wherein the synchronization service synchronizes the application settings across the computing devices identified by the record.

19. A system as recited in claim 16, wherein the operations further comprise:
    causing a user interface to be presented to the user of the synchronization service; and
    receiving, via the user interface, a selection indicative of application settings of the particular application that are to be synchronized across the computing devices registered to the user of the synchronization service.

20. A system as recited in claim 16, wherein the operations further comprise establishing a synchronization connection between the synchronization communication module of the computing device and a synchronization communication module of the at least one other computing device registered to the user, and wherein the change to the application settings on the computing device is communicated over the synchronization connection to the at least one other computing device registered to the user.

* * * * *